United States Patent [19]

Kimura et al.

[11] 4,373,795
[45] Feb. 15, 1983

[54] FILM REWINDING DEVICE FOR CAMERA

[75] Inventors: Hiroyuki Kimura; Tateo Yamada, both of Yokohama, Japan

[73] Assignee: Canon Kabushiki Kaisha, Tokyo, Japan

[21] Appl. No.: 257,231

[22] Filed: Apr. 24, 1981

[30] Foreign Application Priority Data

Apr. 26, 1980 [JP] Japan .................................. 55-55705
Apr. 26, 1980 [JP] Japan .................................. 55-55706

[51] Int. Cl.³ .......................... G03B 1/18; G03B 17/42
[52] U.S. Cl. .................................... 354/173; 354/204; 354/214
[58] Field of Search ............... 354/173, 212, 214, 209, 354/204–206; 242/71.6

[56] References Cited

U.S. PATENT DOCUMENTS 4,273,432 6/1981 Matsuda et al. ................. 354/214 X

*Primary Examiner*—John Gonzales
*Attorney, Agent, or Firm*—Toren, McGeady and Stanger

[57] ABSTRACT

In a camera capable, upon actuation of a film rewind release member, of cutting off the manual or motorized driving torque from the winding transmission system to render the winding operation impossible, while simultaneously rendering the manual or motorized rewinding operation possible, the rewinding device is provided with means responsive to the actuation of the film rewind release member for cutting off the various charge mechanisms from the manual or motorized driving torque transmission system.

10 Claims, 2 Drawing Figures

FILM REWINDING DEVICE FOR CAMERA

BACKGROUND OF THE INVENTION

1. Field of the Invention

This invention relates to film rewinding devices for cameras, and more particularly to film rewinding devices in cameras using 35 mm film.

2. Description of the Prior Art

In the cameras using 35 mm film, the exposed film must be transported back to the supply spool in the cartridge. For this purpose, provision is made of rewinding the film. This generally takes the form that a rewind release button is manually actuated and then a rewind crank is turned. In more detail, such camera as described above is provided with a rapid-winding lever, or an electric motor as a drive source which is drivingly connected to the film transportation mechanism, the charge mechanisms for the shutter, auto-focus and other mechanisms, and the one-frame advancement control mechanism. When in the winding mode, as the transport lever is cocked, or as the motor rotates, these mechanisms are driven to move and are reset so that the camera is ready for the next picture.

After the last frame of film has been exposed, the exposed film must be rewound before it is unloaded. In case where the rewinding is carried out manually, the rewind release button (R button) is pushed to release the film advancing mechanism from the connection with the film, and the rewind crank is then turned. In case where the rewinding is carried out using the motor, after the film advancing mechanism has been taken out of the connection by the rewind release button, a rewind start switch is operated to energize the motor, provided with the assurance that motion of the motor is transmitted to the supply spool in the cartridge.

Of such motorized cameras there is a type in which the drive source is constructed with only one motor, and the transmission of its motion is changed over from the winding drive system to the rewinding drive system, thus making it possible for the motor to suffice to selectively perform the winding and rewinding operations.

Even in the manual rewind type, a camera is also put into practical use that when the winding lever is turned in one and the same direction, winding and rewinding of the film are selectively effected, depending upon whether or not the rewind release button is actuated.

Such motorized or manual winding and rewinding selection drive type camera has a disadvantage that with the rewind release button (R button) unintentionally left pushed upwards, when winding is carried out, or with the R button arrested in the pushed position because of a malfunction, when winding is carried out, though the film remains stationary, the other mechanisms operate likewise as in the normal condition, with the result that a double exposure, or overlap of picture frames is caused to occur. Such situation reveals itself in almost similar outward appearance to that when the normal operation proceeds, and, therefore, the operator is not aware of it, continuing successive shooting with the production of a great failure.

Another disadvantage of the motorized winding and rewinding selection drive type camera is that since it is the common practice in the art that after the rewind release button is first pushed upward, a rewind start switch is closed to set the motor control circuit in the rewind mode, if the actuation of the R button is preceded by the closure of the rewind start switch by mistake, the film is teared at the perforations as it is perforce pulled while no longer advancing because of all film exposed, and in extreme case is cut off from the cartridge.

Still another advantage is that when the R button is taken out of the hold by some reason at a time during the rewinding operation, the camera is switched from the rewinding to the winding mode again.

To prevent this, in the conventional camera it is required that a mechanism be built in so that even when the rewind start switch is only turned on, the circuit is prevented from rendering operative. A further requirement is that a lock member be provided so that when the R button is pushed, it is held in the advanced position, and a member for releasing the R button from this locking engagement is also necessary to provide. This gives rise to an additional disadvantage that the apparatus is made very complicated, and the production cost is remarkably increased.

An object of the present invention is to eliminate the above-described drawbacks and to provide a device responsive to actuation of a rewind release button for cutting off the film advancing mechanism and the various charge mechanisms from the driving torque transmission system.

Another object of the present invention is to provide such an arrangement that a rewind switch remains locked from actuation until and R button is depressed, and after the rewind switch is once turned on, the R button is locked in the pushed position until that switch is turned off.

Other objects of the present invention will become apparent from the following description of an embodiment thereof.

DESCRIPTION OF THE PREFERRED EMBODIMENT

Figure 1:
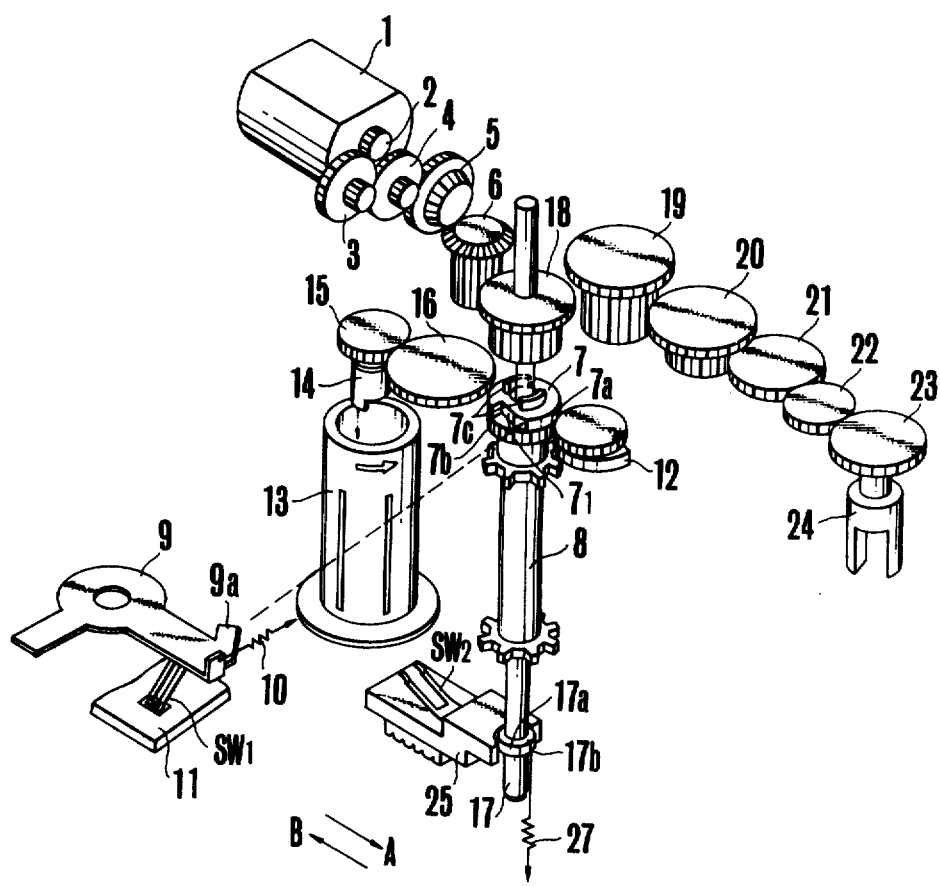
FIG. 1 is an exploded perspective view of an embodiment of a rewinding device in a motorized camera according to the present invention.

The present invention is described in greater detail below by reference to the drawings. FIG. 1 shows an example of a film transportation mechanism in a camera provided with the rewinding device of the present invention. In the figure, 1 is an electric motor as a driving source; 2 to 6 are a speed reduction gear train for transmitting motion of the motor 1. 7 is a one-frame advancement control cam rotating in unison with a sprocket 8, said cam 7 being provided with projected portions 7c with which a clutch gear 18 to be described later is made engageable. This cam 7 is provided with a cutout portion $7_1$. 9 is a cam lever though shown as separated from the cam 7 for the purpose of convenience of explanation, and this cam lever 9 has an extension 9a which is in contact with the cam surface 7a under the action of a spring 10. The cam lever 9 is provided with movable contacts of a switch SW1. As the cam lever 9 moves along the cam surface 7a, when the extension 9a drops in the cutout portion $7_1$, the switch SW1 is turned off as its movable contacts are moved away from an electrically conductive pattern on a substrate 11. Again, the cam lever 9 responsive to completion of an exposure operation is caused to turn against the bias force of the spring 10 until the extension 9a goes out from the cutout portion 7₁. Therefore, the switch SW1 is turned on. Below the cam 7 there is a geared portion 7b with which is meshed a geared cam 12 for driving shutter charge, auto-focus charge and other charge mechanisms to move (the charge mechanisms for the shutter and AF are not shown).

13 is a spool engaging through a friction spring 14 with gears 15 and 16, these parts constituting a winding drive system. 17 is a rewind release button (R button) penetrating the core-hollowed sprocket 8 and one-frame advancement control cam 7 and to an upper part of which is fixed a winding and rewinding change-over clutch gear 18. 25 is a rewind control knob in which are provided movable contacts of a rewind switch SW2. When the knob is moved in a direction indicated by arrow A, the switch SW2 is turned on, as its movable contacts are in contact with a conductive patch on a substrate (not shown). A gear train 19 to 23 meshing with the clutch gear 18 constitutes a rewinding drive system. As the gear 23 rotates, a rewind fork 24 is driven to rotate which in turn drives a spool in a film cartridge (not shown) to effect rewinding of the film.

Figure 2:
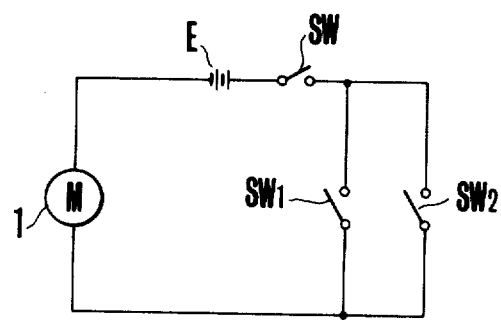
FIG. 2 is an electrical circuit diagram of a control circuit of the motor of FIG. 1.

Here, FIG. 2 shows a control circuit for the motor shown in FIG. 1. In the figure, E is an electrical power source or battery; SW is a power switch; SW1 and SW2 are the switches shown in FIG. 1; and 1 is the motor shown in FIG. 1.

The operation of the mechanism of such construction is as follows: At first the camera is assumed to be in the cocked position with the clutch gear 18 meshing with the gear 16 of the winding drive system. Since, therefore, the extension 9a of cam lever 9 drops in the cutout portion 7₁ of the cam 7, the switch SW1 is OFF. The switch SW2 is also OFF since the rewind control knob is not operated.

In this condition, when the power switch SW is turned on and when a release button (not shown) is depressed, a releasing operation starts to initiate an exposure. When this exposure is terminated, the cam lever 9 is turned against the spring 10, thereby the extension 9a is taken out of the engagement in the cutout portion 7₁, and the switch SW1 is turned on to energize the motor 1. Motion of the motor 1 is transmitted through the gear train 2 to 6 to the clutch gear 18 so that the gear train of the winding drive system rotates the spool 13. The clutch gear 18 has recessed portions (not shown) in the lower surface thereof in which the projected portion 7c from the upper surface of the cam 7 for one-frame advancement of the film is engaged. This cam 7 is unified with the sprocket 8. Therefore, the sprocket 8 is also driven to rotate which in turn drives motion of the gear 7b, thereby the shutter and auto-focus mechanism are being charged, as the extension 9a of the cam lever 9 rides on the camming surface 7a. At the same time when the advancement of the film through the length of one frame and the charging operation of the various mechanisms are completed, the extension 9a drops into the cutout portion 7₁, and the switch SW1 is turned off to de-energize the motor 1. Thus, one cycle of winding operation is completed.

Then, as the camera has returned to the initial position, when a release is actuated again, the above-described operation repeats itself. And, the exposure operation and the winding operation alternate until the certain number of frames of film are exposed.

When to carry out a rewinding operation, the operator pushes the rewind release button 17 upwards against the force of the spring 27, thereby the clutch gear 18 fixedly mounted on the rewind release button 17 is moved upwards, and disengaged from the gear 16 of the winding drive system, and instead brought into engagement with the gear 19 of the rewinding drive system. At this time, the sprocket 8 and the one-frame advancement control cam 7 are left alone as such upward movement of the clutch gear 18 results in the disengagement of the projected portions 7c on the upper surface of the cam 7 therefrom, so that the driving torque is no longer transmitted to this system. Also the projected portion 17a on the rewind release button 17 is taken out of the locking connection to the rewind control knob 25 so that the rewind control knob 25 becomes slidable to the direction A in FIG. 1. Upon sliding movement of the rewind control knob 25 to the direction A, as the lower surface of the projected portion 17a of the rewind release button 17 abuts on the end portion of the rewind control knob 25, the rewind release button 17 is locked in the pushed position against the force of the spring 27. Such sliding movement of the switch carrier 25 to the direction A also causes the switch SW2 arranged thereon with its movable contacts to contact with the conductive patch on the substrate (not shown), thus changing over the circuit to the rewinding mode. As the motor 1 rotates, motion of it is transmitted through the reduction gear train to rotate the clutch gear 18. Since, at this time, the gear 18 meshes with the gear 19 of the rewind gear train, the rewinding drive system with the gears 19 to 23 operates, thus rewinding the exposed film into the film container (not shown) engaging with the fork 24.

It is pointed out in connection with the camera of such construction that if the operator overlooks the rewind release button unintentionally left in the pushed position before a release of the camera is actuated, though the termination of the exposure is followed by the closure of the switch SW1 as has been mentioned above, and therefore by energization of the motor 1, no advancement of the film and no actuation of the charge mechanisms are resulted because the clutch gear 18 while being rotated by the motor 1 through the speed reduction gear train 2 to 6 is disconnected from the one-frame advancement control cam 7. At this time, the motor 1 carries out the rewinding operation so that the photographer is readily aware of the abnormal condition.

It is also pointed out that the rewinding device of the invention insures that as long as the winding operation goes on with the rewind release button 17 not pushed in to permit the drive of the sprocket, the charging of the shutter and the auto-focus mechanism, and the advancement of the film through the length of one frame, the rewind control knob 25 cannot be moved because of its abutting against the projected portion 17a of the R button, thus preventing the circuit from being accidentally switched to the rewinding mode.

It is further noted that it is after the rewind release button has been pushed in, that the rewind control knob 25 is made movable to the A direction as the projected portion 17a of the R button is moved away from the range of movement of the knob 25, and that after the circuit is once switched to the rewinding mode by moving the knob 25 to the A direction, the R button 17 is locked in the pushed position by the projected portion 17b abutting on the upper surface of the rewind control knob 25, thus preventing the clutch gear 18 from being accidentally disengaged from the rewinding drive system.

When to stop the rewinding operation, the rewind control knob 25 is moved to a B direction, thereby the switch SW2 is turned off, and at the same time the R button 17 is released from the locking connection to move downwards under the action of spring 27. This in turn causes the clutch gear 18 to be changed over from the rewinding to the winding position.

As has been described above in greater detail, the rewinding device of the present invention makes use of such construction and arrangement that when in the winding mode, the R button serves to restrain the rewind control knob from movement, and when in the rewinding mode, the rewind control knob serves to restrain the R button from returning. Therefore, there is no need to provide a mechanical or electrical means for preventing the camera from being switched to the rewinding mode in response to accidental actuation of the rewind control knob at a time during the winding operation. Further another means which would be otherewise necessary to lock the R button in the rewinding position is no longer required to make use of. Furthermore, the means for releasing the R button from the locking connection in response to, for example, actuation of a shutter release is also omitted. Since the R button and the rewind control knob which constitute the minimum requirements in order to switch the camera to the rewinding mode are made to cooperate with each other in perform the each other locking function with the advantage that the structure is simplified and the production cost is remarkably reduced.

What is claimed is:

1. A film rewinding device for a camera including:
a film advancing mechanism;
a charge mechanism;
a film rewinding mechanism;
driving means for carrying out a winding operation of the film advancing mechanism and charge mechanism, and a rewinding operation of the film rewinding mechanism; and
changeover means for carrying out changing of said winding operation and said rewinding operation, said means having:
    (a) a control member movable between a first position for cooperation with the film advancing mechanism and a second position for cooperation with the film rewinding mechanism, said control member being driven to move by said driving means;
    (b) an operating member for moving said control member from one of the first and second positions to the other; and
    (c) an engagement member arranged to engage with said control member when it is at the first position and releasable from the engagement with said control member when it is at the second position, said engagement member being associated with the charge mechanism when it is engaged with the control member, and being associated with the charge member when it is released from the engagement with the control member.

2. A device according to claim 1, wherein each of said film advancing and said film rewinding mechanisms includes a different gear, and said control member is a clutch gear arranged to mesh with the gear of said film advancing mechanism when in the first position, and to mesh with the gear of the film rewinding mechanism when in the second position.

3. A device according to claim 2, wherein said engagement member constitutes part of a clutch along with said clutch gear.

4. A device according to claim 3, wherein said operating member is a rewind release button.

5. A device according to claim 4, wherein said driving means includes an electric motor.

6. A device according to claim 1, including a one-frame advancement control mechanism, and said engagement member is operatively associated with the one-frame advancement control mechanism.

7. A film rewinding device for a camera including:
a film advancing mechanism;
a charge mechanism;
a film rewinding mechanism;
driving means for carrying out a winding operation of the film advancing mechanism and charge mechanism, and a rewinding operation of the film rewinding mechanism; and
changeover means for carrying out changing of said winding operation and said rewinding operation, said means having:
    (a) a clutch gear movable between a first position for cooperation with the film advancing mechanism and a second position for cooperation with the film rewinding mechanism, said clutch gear being driven to move by said driving means;
    (b) a rewind release button shaft fixedly carrying said clutch gear, said rewind release button controlling the movement of said clutch gear from one of the first and second positions to the other;
    (c) an engagement member constituting a clutch together with said clutch gear, said engagement member being engaged with said clutch gear when said clutch gear is in the first position, and being released from the engagement with the gear when the gear is at the second position, and wherein said engagement member is associated with the charge mechanism when it is engaged with the clutch gear and being associated with the charge mechanism when it is released from the engagement with the clutch gear; and
    (d) a sprocket fixedly mounted on said engagement member, the interior of said sprocket being penetrated by said rewind release button shaft.

8. A film rewinding device for a camera including:
a film advancing mechanism for providing a film winding operation;
a charge mechanism;
a film rewinding mechanism for providing a film rewinding operation;
driving means for actuating the winding operation of the film advancing mechanism and the charge mechanism, and for actuating the rewinding operation of the film rewinding mechanism;
changeover means for enabling selective changing of one of said winding operation and said rewinding operation to the other, said changeover means including:
    (a) a control member arranged for movement between a first position for operatively engaging the film advancing mechanism and a second position for operatively engaging the film rewinding mechanism, said control member being driven to move by said driving means;

(b) a first operating member for selectively moving said control member from one of the first and second positions to the other;
(c) an engagement member arranged to engage with the control member and to operate in unison therewith when said control member is in the first position, wherein said engagement member is operatively associated with said charge mechanism; and
(d) a second operating member for holding said first operating member in the second position; and a rewind switch operatively arranged with said second operating member for controlling said driving means.

9. A device according to claim 8, including a one-frame advancement control mechanism and a wind switch, and said engagement member is operatively associated with the one-frame advancement control mechanism, said one-frame advancement control mechanism controlling the wind switch in response to an actuation thereof.

10. A film rewinding device for a camera including:
a film advancing mechanism;
a film rewinding mechanism;
driving means for carrying out a winding operation of the film advancing mechanism and a rewinding operation of the film rewinding mechanism;
a switch controlling said driving means;
changeover means for carrying out changing of said winding operation and said rewinding operation, said means having:
(a) a control member movable between a first position for cooperation with the film advancing mechanism and a second position for cooperation with the film rewinding mechanism, said control member being driven to move by said driving means;
(b) a first operating member for moving said control member from one of the first and second positions to the other; and
(c) a second operation member for controlling the switch to open or close;
second second operation member being made inoperative by the first control member when the first operation member is operated as as to place the control member at the first position and holding the operation state of the first operation member when the first operation member is operated so as to place the control member at the second position.

* * * * *